United States Patent [19]
Akiyama et al.

[11] Patent Number: 5,468,519
[45] Date of Patent: Nov. 21, 1995

[54] METHOD FOR FORMING AN ORIENTATION FILM INCLUDING COUPLING AN ORGANIC COMPOUND TO A SILANE COUPLING AGENT IN A MAGNETIC OR ELECTRICAL FIELD

[75] Inventors: Hisashi Akiyama, Ayama; Shuji Miyoshi, Yamatokoriyama, both of Japan

[73] Assignee: Sharp Kabushiki Kaisha, Osaka, Japan

[21] Appl. No.: 163,863

[22] Filed: Dec. 8, 1993

[30] Foreign Application Priority Data

Dec. 11, 1992 [JP] Japan .................................. 4-331624

[51] Int. Cl.$^6$ ........................... B05D 3/14; G02F 1/13
[52] U.S. Cl. .......................... 427/532; 427/108; 427/165; 427/547; 359/76; 428/1
[58] Field of Search ..................... 427/532, 547, 427/598, 162, 165, 169, 108; 428/1; 359/76; 156/104, 108

[56] References Cited

U.S. PATENT DOCUMENTS

| | | | |
|---|---|---|---|
| 4,892,392 | 1/1990 | Broer | 350/339 R |
| 5,256,456 | 10/1993 | Ogawa | 359/76 |
| 5,315,419 | 5/1994 | Soupe et al. | 359/46 |

FOREIGN PATENT DOCUMENTS

| | | |
|---|---|---|
| 0261712 | 3/1988 | European Pat. Off. . |
| 282254 | 9/1988 | European Pat. Off. . |
| 0386782 | 9/1990 | European Pat. Off. . |
| 57-79915 | 5/1982 | Japan . |
| 58-123520 | 7/1983 | Japan . |
| 64-6924 | 1/1989 | Japan .................................. 427/162 |
| 02165119 | 6/1990 | Japan . |
| 4-204416 | 7/1992 | Japan . |

OTHER PUBLICATIONS

T. Uchida et al., *Electronics and Communications in Japan*, 58–C(4):132–135 (Apr. 1975).
Patent Abstracts of Japan, vol. 7, No. 238 (Oct. 1983).
Patent Abstracts of Japan, vol. 12, No. 114 (Apr. 1988).
Patent Abstracts of Japan, vol. 11, No. 386 (Dec. 1987).

*Primary Examiner*—Terry J. Owens
*Attorney, Agent, or Firm*—David G. Conlin; Peter F. Corless

[57] ABSTRACT

Methods for forming an orientation film comprising a first step wherein a silane coupling agent is chemically adsorbed on a substrate surface, and a second step wherein an organic compound comprising a functional group capable of coupling with the silane coupling agent is coupled with the silane coupling agent. The second step includes a) applying a magnetic or electrical field in a selected direction to a mixture of 1) a liquid crystal compound being in a liquid crystal phase when heated and 2) the organic compound, b) contacting the substrate with the mixture which is in the applied magnetic or electrical field, and c) heating the mixture which is contacted with the substrate to a temperature sufficient for coupling of the silane coupling agent and the organic compound during the magnetic or electrical field application. The organic compound coupled with the silane coupling agent is directed toward a direction corresponding to the selected direction of the magnetic or electrical field.

13 Claims, 3 Drawing Sheets

METHOD FOR FORMING AN ORIENTATION FILM INCLUDING COUPLING AN ORGANIC COMPOUND TO A SILANE COUPLING AGENT IN A MAGNETIC OR ELECTRICAL FIELD

BACKGROUND OF THE INVENTION

1. Field of the Invention

The present invention relates to a method for forming an orientation film wherein a mixture of a liquid crystal compound and an organic compound which is oriented to a certain direction by utilizing orientation of the liquid crystal compound to the certain direction caused by magnetic field or voltage application is coupled to a silane coupling agent chemically adsorbed on a substrate surface.

2. Description of the Related Art

Generally, a liquid crystal display device is manufactured in a manner comprising the following steps:

Transparent stripe-shaped electrodes made of a material such as indium tin oxide (I TO) are formed on transparent substrates made of a material such as glass, whereafter an orientation film is formed thereon. Then such two transparent substrates are disposed opposite to each other so that cross portions of the transparent electrodes are arranged in a matrix form. A spacer is disposed between the peripheral portions of both the substrates in order to provide a gap therebetween and the peripheral portions of both the substrates and the spacer are bonded with an adhesive agent. A liquid crystal is injected through an inlet into the gap and the inlet is sealed, whereby a liquid crystal device is formed. Thereafter, a polarization plate is disposed on both sides of the liquid crystal device so that polarization axes through both the sides thereof make a right angle with each other. Finally a liquid crystal display device which functions as a display device is completed by backlighting from one of the sides thereof and applying a voltage thereto. Namely, displaying is performed by utilizing a character that when a voltage is applied to the liquid crystal device, an orientation phase of liquid crystal molecules varies, which results in variation of a transmitted light quantity.

It is indispensable to uniformly orient injected liquid crystal molecules to a certain direction in order to obtain a liquid crystal device with a high contrast. The uniform orientation depends on an used orientation film. There are found several methods of forming an orientation film. For instance, in rubbing method, a high molecular film of polyimide, polyvinyl alcohol or the like is applied on a substrate having electrodes thereon by use of a spinner. Thereafter the surface of the high molecular film is rotationally rubbed toward a certain direction with a roller wrapped with a cloth made of nylon. As a result of this process, distortion anisotropy is provided, which makes it possible to form an orientation film wherein the longitudinal axes directions of liquid crystal molecules direct toward the rubbing direction.

Further, a method for forming a monomolecule adsorption film made of a silane coupling agent disclosed in Japanese Unexamined Patent Publications JP-A 66-7913 and JP-A 66-186818 (KoKai) is well known. In this method are utilized several kinds of silane coupling agents which have a normal carbon chain, and a monochloro or trichloro silane group at one end thereof which is to be bonded on a substrate having electrodes, or have a compound at one end thereof whose structure is similar to that of a liquid crystal molecule to be injected into a liquid crystal device. These silane coupling agents are applied to the substrate with electrodes in order to be adsorbed on the entire surface of the substrate by a chemical adsorption method, whereby a monomolecule adsorption film made of the silane coupling agent is formed.

Further, according to other method (disclosed in January J. Appl. Phys. Vol. 29 No. 9, L1689 (1990)) for forming a monomolecule adsorption film, a mixture of silane coupling agents with different lengths of normal carbon chains is employed to control a pretilt angle of a liquid crystal molecule.

However, among the above-mentioned methods, the rubbing method is an easy method of rubbing the surface of the polymer film with a cloth wrapping around a roller. The method is widely employed in industries due to the excellent mass productivity and high reliability thereof, to be sure, but it has several disadvantages as follows.

Electrostatic break down might occur in a thin film transistor for driving due to static electricity caused by rubbing with the cloth in a case of an active matrix type of liquid crystal device in which a metal-oxide-semiconductor field-effect transistor (MOS-FED) is integrated. Further, the ununiform thickness of the substrate, abrasion of the rubbing cloth or rubbing cloth dusts deposited on the polymer film causes ununiformity of the rubbing intensity, which might also result in ununiform orientation. A method without rubbing has been investigated in order to eliminate these disadvantages and a chemical adsorption method of a silane coupling agent has been proposed. In particular, satisfactory orientation can be achieved in a monomolecular adsorption film made of a silane coupling agent containing a compound whose molecular structure is similar to that of a liquid crystal molecule, because a liquid crystal injected into a liquid crystal device is penetrated into a gap between molecules of the compound with the structure similar to that of the liquid crystal. This method almost solves the problems in the rubbing method. However, while vertical orientation of the liquid crystal can be achieved due to the action of the silane coupling agent as an vertical-orientation agent, such orientation of liquid crystal molecules as inclined orientation to a certain direction and horizontal orientation cannot be achieved in this method unlike the rubbing method.

When a mixture of silane coupling agents having a normal carbon chain whose length is different from that of each another is employed for a monomolecular adsorption film, a pretilt angle can be controlled by varying a mixing ratio of these silane coupling agents. The orientation direction of the mixture of the silane coupling agents, however, is not controlled also in this case and therefore it is necessary to control the orientation direction of the mixture of the silane coupling agents in a manner such as rubbing, on or after the formation of a monomolecular adsorption film, in order to orient a liquid crystal to a certain direction.

SUMMARY OF THE INVENTION

Accordingly, it is an object of the invention to solve the problems of the conventional art and provide a method for forming an orientation film capable of orienting liquid crystal molecules uniformly to a certain direction without a rubbing step.

The invention presents a first method for forming an orientation film comprising: a first step wherein a silane coupling agent is chemically adsorbed on a substrate surface, and a second step wherein an organic compound is coupled with the silane coupling agent in a manner that while a magnetic field is applied in a certain direction to a mixture of a liquid crystal compound being in a liquid crystal phase when heated and the organic compound with a functional group to be coupled with the silane coupling agent, the substrate is heated and dipped in the mixture to be directed to a certain direction relative to the direction of the magnetic field application; or after being dipped in the mixture to be directed to the certain direction relative to the direction of the magnetic field application, the substrate is heated in the mixture, or a second step wherein an organic compound is coupled with the silane coupling agent in a manner that firstly the substrate is dipped in the mixture, secondly a magnetic field is applied in a certain direction relative to the dipping direction of the substrate and finally the substrate is heated during the magnetic field application.

It is preferable in the second step to firstly apply the magnetic field to the mixture, and furthermore it is more preferable to heat after the substrate has been dipped.

Further, the invention presents a second method for forming an orientation film comprising: a first step wherein a silane coupling agent is chemically adsorbed on a substrate surface, and a second step wherein an organic compound is coupled with the silane coupling agent in a certain direction in a manner that while a voltage is applied in a certain direction to a mixture of a liquid crystal compound being in a liquid crystal phase when heated and the organic compound with a functional group to be coupled with the silane coupling agent, the substrate is dipped to be directed to a certain direction relative to the direction of the voltage application and the mixture is heated up to a temperature whereat a reaction between the silane coupling agent and the organic compound begins. It is preferable in the second step to utilize a substrate with a plurality of stripe-shaped electrodes arranged parallel to each other and to apply a voltage to the mixture so that the polarities between the neighboring electrodes are different.

More specifically, the silane coupling agent is that with an epoxide at one end and the organic compound is that with at least one hydroxyl or amino group, or the coupling agent is that with a vinyl group at one end and the organic compound is that with at least one amino group.

The manufacturing method of the liquid crystal device of the invention is characterized in that the two substrates on which an orientation film is formed are disposed opposite to each other to be s ticked through a spacer and then a gap between the substrates is filled with a liquid crystal.

An organic compound is oriented to a certain direction in a magnetic or electrical field by a liquid crystal for orientation and is coupled with a silane coupling agent. That makes it possible to control the orientation direction of the liquid crystal for display and uniformly orient the liquid crystal for display to any direction on a horizontal plane. Furthermore, the electrostatic breakdown of a thin film transistor, dusts deposition, and ununiform orientation which are observed in the rubbing process are reduced.

In particular, it is possible to freely control the orientation direction of the organic compound, i.e. the orientation direction of the liquid crystal for display, by varying the direction of a magnetic field to the substrate if magnetic field application is utilized.

The relationship between the direction of voltage application and the orientation direction of longitudinal molecular axes of the liquid crystal for orientation and the organic compound depends on the dielectric anisotropy of the liquid crystal used for orientation. More specifically, when the dielectric anisotropy is positive, the direction of the voltage application and the orientation direction of the longitudinal molecular axes of the organic compound and the liquid crystal for orientation are identical. On the other hand, when the dielectric anisotropy is negative, the direction of the voltage application makes a right angle with the orientation direction of the longer molecular axis of the liquid crystal for orientation, namely of the organic compound. Additionally, since the magnetic susceptibility anisotopy is positive when a liquid crystal molecule is a normal one including an aromatic ring such as a benzene ring, the direction of the magnetic field is the same as the orientation direction of the longer molecular axis of the organic compound and the liquid crystal for orientation.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
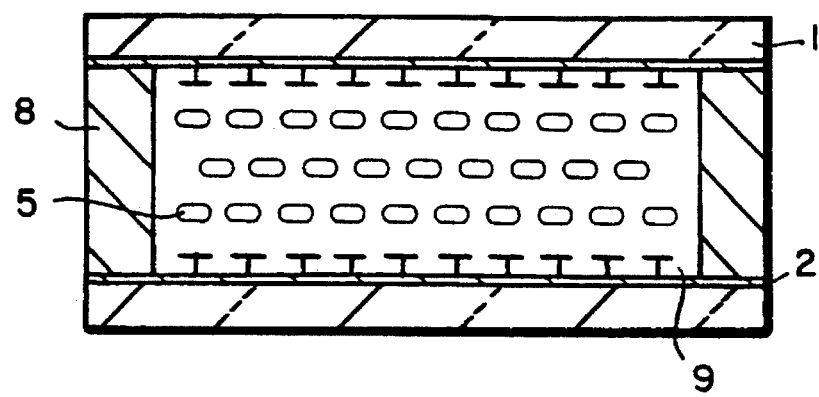
FIG. 1 is a schematic illustration of a liquid crystal device for display using an orientation film showing an embodiment of the invention.

Now referring to the drawing, preferred embodiments of the invention are described below.

Figure 2:
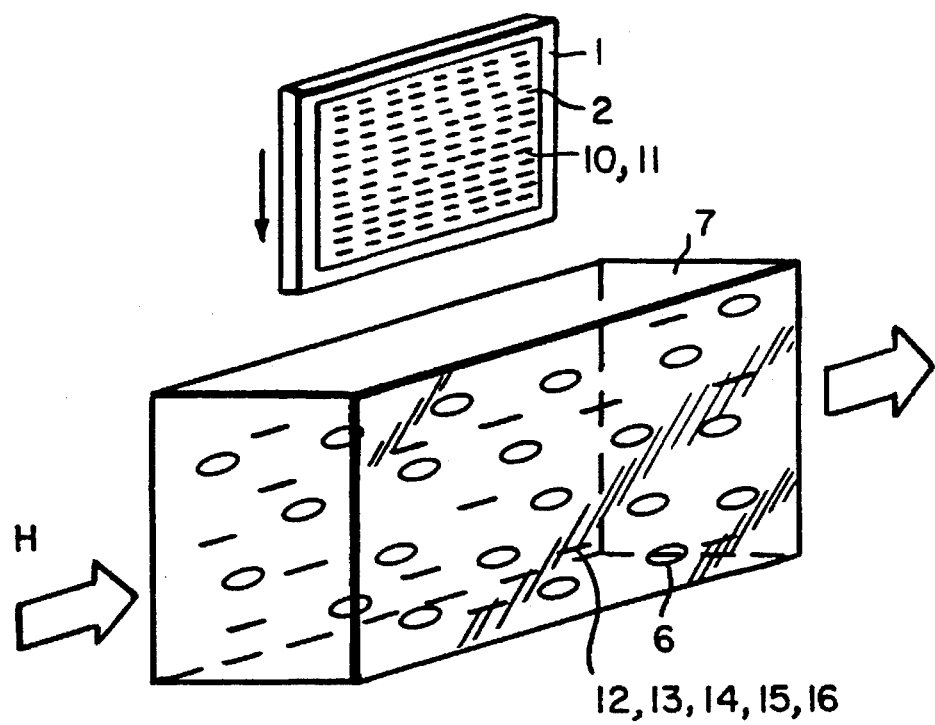
FIG. 2 is a flow chart of producing steps of a liquid crystal orientation film using a magnetic field application method.
Figure 3:
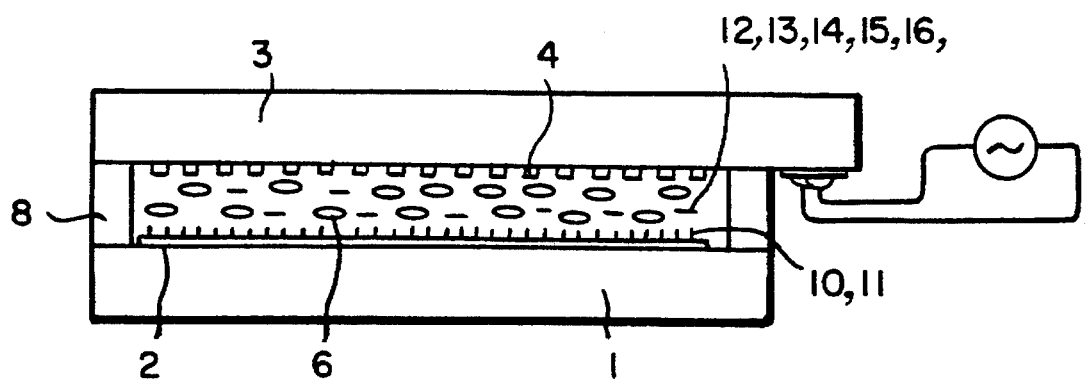
FIG. 3 is a flow chart of producing steps of a liquid crystal orientation film using a voltage application method.
Figure 4:
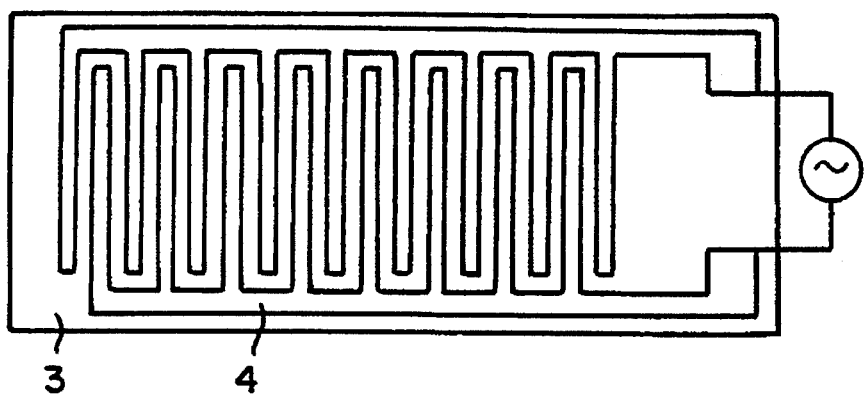
FIG. 4 is a plan view of an example of an electrode used in the voltage application method.
Figure 5:
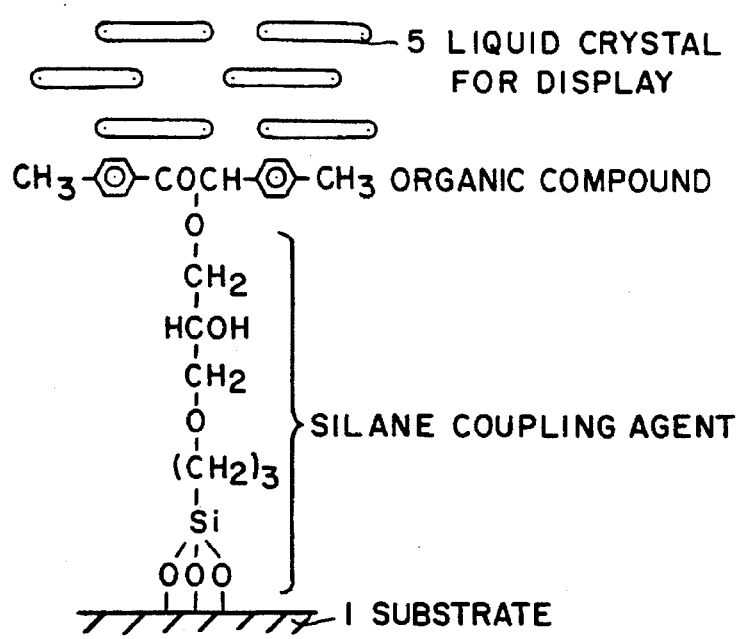
FIG. 5 is a conceptual one of a molecular structure of a liquid crystal orientation film showing an embodiment of the invention.
Figure 6:
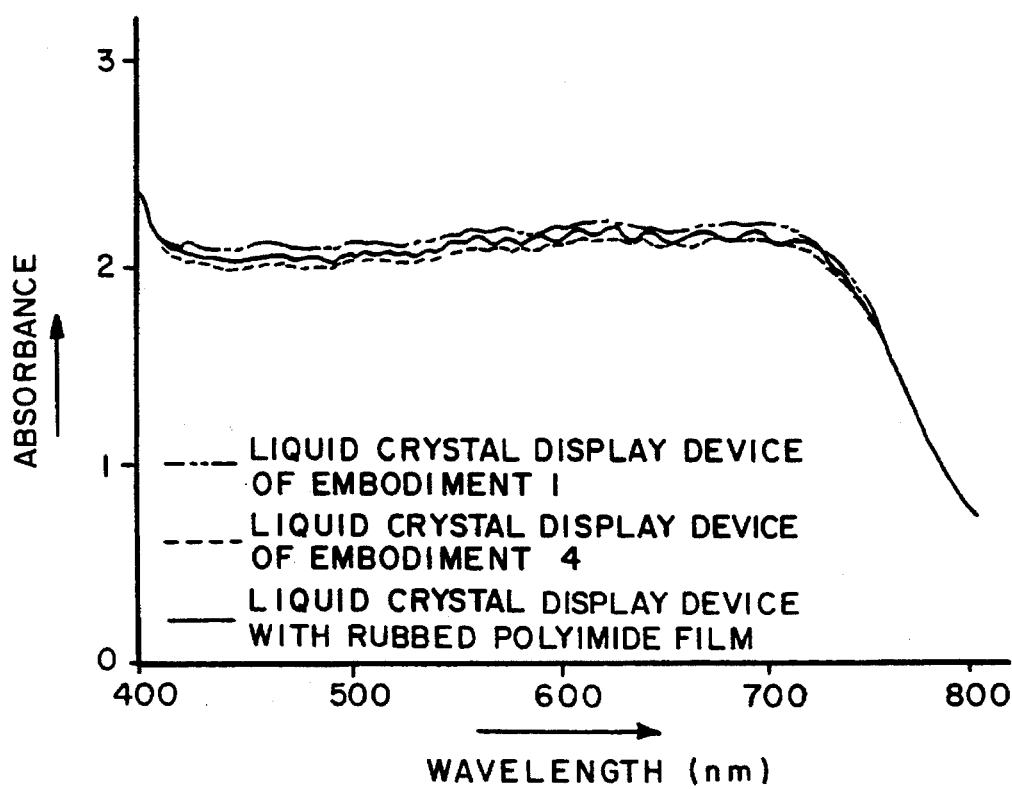
FIG. 6 is absorption spectrum graphs of a liquid crystal device showing an embodiment of the invention and a liquid crystal device using a polyimide rubbing film at a quenching position, when the liquid crystal devices are rotated between polarizing plates disposed in a cross Nicol form.

FIG. 1 is a schematic illustration of a liquid crystal device for display using an orientation film 9 showing an embodiment of the invention;

FIG. 2 is a flow chart of producing steps of a liquid crystal orientation film 9 using a magnetic field application method;

FIG. 3 is a flow chart of producing steps of a liquid crystal orientation film 9 using a voltage application method;

FIG. 4 is a plan view of an example of an electrode used in the voltage application method FIG. 5 is a conceptual one of a molecular structure of a liquid crystal orientation film 9 showing an embodiment of the invention; and FIG. 6 is absorption spectrum graphs of a liquid crystal device showing: an embodiment of the invention and a liquid crystal device using a polyimide rubbing film at a quenching position, when the liquid crystal devices are rotated between polarizing plates disposed in a cross Nicol form.

In the embodiments 1 to 3 and 8 to 10, a one molecule of one silane coupling agent is coupled with a one molecule of the organic compound. In the embodiments 4 to 7 and 11 to 14, two molecules of the silane coupling agent are coupled with a one molecule of the organic compound.

The coupling is caused by the reaction between the functional groups belonging to the organic compound and to the silane coupling agent, respectively. The combination of the functional group of the silane coupling agent and that of the organic compound is selected taking account of that the organic compound contributes to form uniform mixture without negative effect on the reactivity and on the liquid crystal for orientation.

In view of the reactivity, a silane coupling agent with an epoxide is suitable to an organic compound with a hydroxyl or amino group and a silane coupling agent with a vinyl group is suitable to an organic compound with an amino group. When a silane coupling agent with an epoxide is coupled with an organic compound with a hydroxyl or amino group, it is known as the coupling mechanism that a ring of epoxide is opened and coupling of the epoxide group with the hydroxyl or amino group occurs. On the other hand, when a silane coupling agent with a vinyl group is coupled with an organic compound with an amino group, the coupling therebetween is caused by bonding of the amino group with the vinyl group due to Michael addition reaction. Therefore, it is preferred in view of the stability of the orientation film that a lot of functional groups such as hydroxyl group and amino group which react with the silane coupling agent are contained in the organic compound. When an organic compound, as shown in the following structural formula, with two functional groups positioned nearly at both longitudinal ends of the organic compound molecule is employed, the stability of the orientation film is secured because both the ends of the organic compound molecules are fixed by coupling with a silane coupling agent. Additionally, even when an organic compound with only one functional group is employed, the stability of the orientation film is secured in a certain degree provided that the employed organic compound includes a functional group such as hydroxyl group and amine group nearby the longitudinal center of the molecule thereof. Moreover, a length of the molecule of the silane coupling agent is preferred to be shorter in view of stability of the orientation film.

Examples of each substance shown in the following structural formulas are preferable, considering that the organic compound should form a homogeneous mixture without negative effect on a liquid crystal for orientation, the organic compound should not have too many side chains which disturb the orientation of the liquid crystal toward a longitudinal direction of the organic compound molecule, and the molecule length thereof In the longitudinal direction is ⅓ to 3 times as long as that of the liquid crystal molecule to be oriented. Preferred examples of silane coupling agent with an epoxide group are:

[formula 1]

CH$_2$—CH—CH$_2$OCH$_2$CH$_2$CH$_2$Si(OCH$_3$)$_3$
　　\ /
　　 O

CH$_2$—CH—CH$_2$OCH$_2$CH$_2$CH$_2$SiCl$_3$
　　\ /
　　 O

Preferred examples silane coupling agent with a vinyl groups are:

[formula 2]

CH$_2$=CHSi(OCH$_3$)$_3$
CH$_2$=CHSi(OC$_2$H$_5$)$_3$, CH$_2$=CHSiCl$_3$
CH$_2$=CHSi(OC—CH$_3$)$_3$,
　　　　　　 ‖
　　　　　　 O

CH$_2$=C—COOCH$_2$CH$_2$CH$_2$Si(OCH$_3$)$_3$
　　|
　　CH$_3$

Preferred examples of organic compound with hydroxyl group are:

[formula 3]

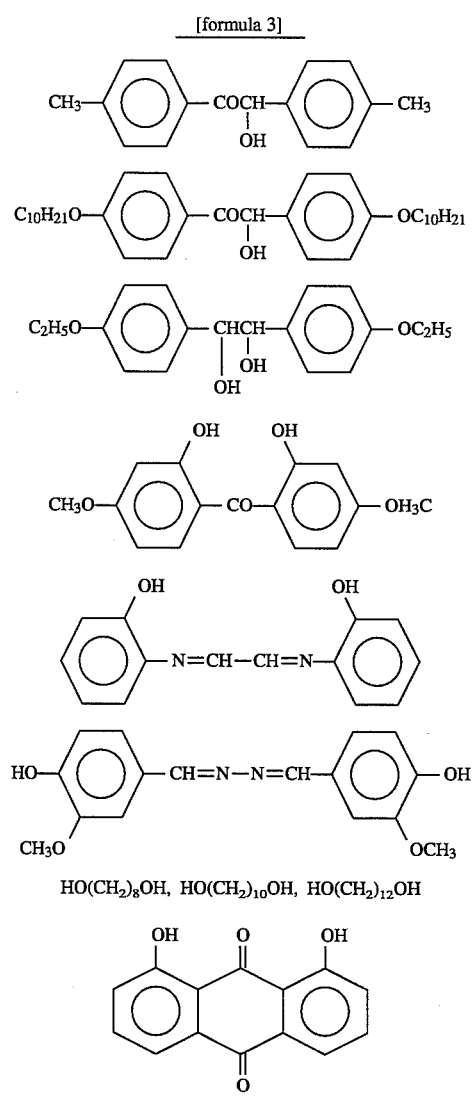

HO(CH$_2$)$_8$OH, HO(CH$_2$)$_{10}$OH, HO(CH$_2$)$_{12}$OH

Preferred examples of organic compound with an amino group are:

[formula 4]

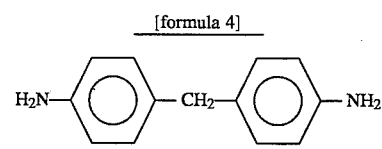

-continued
[formula 4]

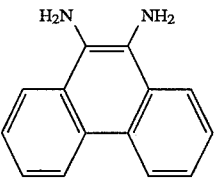

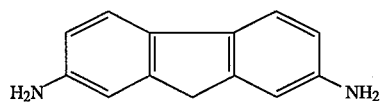

Embodiment 1

An employed substrate is a glass substrate 1 with an ITO electrode 2 which is finely processed as shown in FIG. 1, and a material for an insulation film such as $SiO_2$ is rotationally applied to the substrate by using a spinner, followed by thermal treatment, in order to form an insulation film, A toluene solution (approximately 0.1 to 5%, preferably 1 to 3%) is prepared containing a 1% silane coupling agent 10 of the structural formula (I) and the glass substrate 1 is dipped therein to conduct chemical adsorption of the silane coupling agent 10. After dipping, the substrate 1 is Subjected to heat treatment at a temperature of 120° C. (100° C. to 130° C.) for about one hour and then the unreacted silane coupling agent is removed by washing the surface thereof with toluene.

A glass container 7 shown in FIG. 2 holds a liquid crystal for orientation control therein which is arranged in a certain direction and to which 1 wt % organic compound 12 of the structural formula (III) to be coupled with the silane coupling agent 10 in a certain direction was added. The addition amount of the organic compound to the liquid crystal is preferably 1 to 3 wt % which causes no crystallization. The mixture is homogeneously pre-melted at a temperature of 120° C. The reaction of the silane coupling agent upon the organic compound is caused by applying at least 8K gauss magnetic field, preferably 10 to 20K gauss to the mixture contained in the glass container 7 and heating up to approximately 100° C. Since the isotropic phase of liquid crystal molecules for orientation control makes it impossible to orient the organic compound 12, the molecules should be in a liquid crystal phase also at a temperature of approximately 100° C., and is further preferable to be in a nematic phase. Moreover, it is necessary that the organic compound 12 is homogeneously mixed with the liquid crystal 6 for orientation control without crystallization. In this embodiment, a nematic liquid crystal of PDX-5080 transition temperature (° C.) C- 24.N.113.2.I) manufactured by Rodic was used as a liquid crystal which meets the above-mentioned requirements.

Then, as shown in FIG. 2, the glass substrate 1 is dipped in the mixture in the glass container 7 so that a surface of the glass substrate and a desired orientation direction of the liquid crystal are parallel with the direction of magnetic field application. After the mixture where the glass substrate is dipped is heated up to approximately 100° C. and left as it is for 30 minutes, the glass substrate 1 is taken out from the glass container 7 and the liquid crystal 6 for orientation control and the organic compound 12 unreacted with the silane coupling agent are removed by washing the glass substrate surface with toluene.

A pair of substrates prepared in the above manner are sticked to each other through a spacer 8 with a thickness of 12 μm excepting a one injection port to form a cell so that the orientation direction of the orientation film of each substrate is identical with that of each other as shown in FIG. 1, and the injection port is dipped in a nematic liquid crystal 5 of "E-8" manufactured by Mere in a vacuum state. By restoring to an atmospheric pressure, the liquid crystal is introduced into the cell to form a liquid crystal device.

Uniform optical-quenching was observed every 90° when the liquid crystal devices were rotated between polarizing plates disposed in a cross Nicol form thereof. The absorbance of the liquid crystal device with the orientation film formed in this manner is almost identical with that with a rubbed orientation film, as compared with the absorbances at an optical quenching position shown in FIG. 6. Further, a pretilt angle was measured to be approximately 0°. Based on these results, it is found that the orientation is uniform and as well that is a homogeneous orientation arranged to the magnetic field application direction which is parallel to the substrate. As a result, the conceptual figure of the molecular structure of the liquid crystal orientation film is supposed as shown in FIG. 5. The longitudinal axes of the molecules of the organic compound directs to the direction parallel to the substrate, namely the magnetic field application direction, and the molecules thereof are coupled to the silane coupling agent which is chemically adsorbed almost vertically to the substrate.

[Formula 5]

$$CH_2\underset{O}{\overset{}{\diagdown\diagup}}CH-CH_2OCH_2CH_2CH_2Si(OCH_3)_3 \quad (I)$$

[Formula 6]

Embodiment 2

A further embodiment of the liquid crystal device in which a nematic liquid crystal was injected was produced and examined under the identical conditions with those of Embodiment 1 except that an employed mixture contained 3 wt % organic compound and the balance thereof was a nematic liquid crystal, "RDP-10848" (transition temperature (° C.) C.-46.N.104.6.1). The structural formula of the employed organic compound which is coupled with the silane coupling agent is shown in formula (III). It was Sound that the liquid crystal orientation was uniformly homogeneous.

Embodiment 3

A further embodiment of the liquid crystal device in which a nematic liquid crystal was injected was produced and examined under the identical conditions with those of Embodiment 1 except that an organic compound 13 shown in Structural Formula (IV) was employed as an organic compound which is coupled with the silane coupling agent in a certain direction. The liquid crystal orientation was uniformly homogenous.

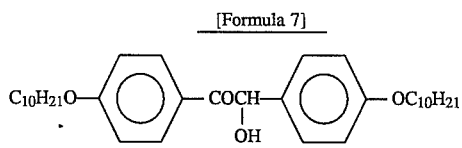

[Formula 7] (IV)

Embodiment 4

A further embodiment of the liquid crystal device in which a nematic liquid crystal was injected was produced and examined under the identical conditions with those of Embodiment 1 except the following points. An employed nematic liquid crystal was that under the designation "E-8" manufactured by Merck. An organic compound 14 shown in Structural Formula (V) was employed as an organic compound which is coupled with the silane coupling agent in a certain direction. The mixture of the liquid crystal and the organic compound was heated up to 60° C. and kept for a one hour in this state.

It was found from the results of the examination that the liquid crystal orientation is uniformly homogeneous,

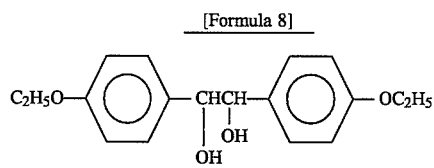

[Formula 8] (V)

Embodiment 5

A further embodiment of the liquid crystal device in which a nematic liquid crystal was injected was produced and examined under the identical conditions with those of Embodiment 1 except that an organic compound 15 shown in Structural Formula (VI) was employed as an organic compound which is coupled with the silane coupling agent in a certain direction and the mixture of the organic compound and the liquid crystal for orientation was once premelted at a temperature of 140° C. homogeneously. The orientation of the liquid crystal was found to be uniformly homogeneous.

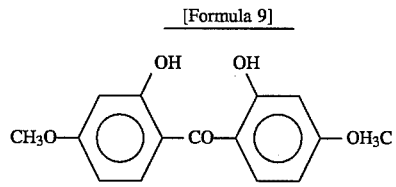

[Formula 9] (VI)

Embodiment 6

A further embodiment of the liquid crystal device in which a nematic liquid crystal was injected was produced and examined under the identical conditions with those of Embodiment 1 except that an organic compound 16 shown in Structural Formula (VII) was employed as an organic compound which is coupled with the silane coupling agent in a certain direction. The orientation of the liquid crystal was found to be uniformly homogeneous.

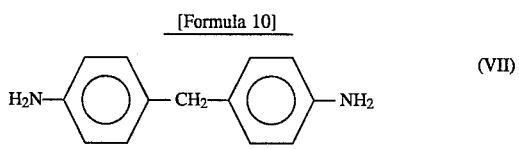

[Formula 10] (VII)

Embodiment 7

A further embodiment of the liquid crystal device in which a nematic liquid crystal was injected was produced an examined under the identical conditions with those of Embodiment 1 except that a silane coupling agent 11 shown in Structural Formula (II) was employed as the silane coupling agent and an organic compound 16 shown in Structural Formula (VII) was employed as an organic compound which is coupled with the silane coupling agent in a certain direction. The orientation of the liquid crystal was found to be uniformly homogeneous.

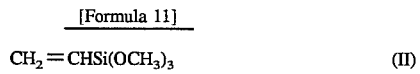

[Formula 11]
$CH_2 = CHSi(OCH_3)_3$ (II)

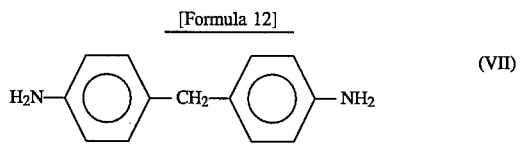

[Formula 12] (VII)

Embodiment 8

A glass substrate 1 on which a silane coupling agent was chemically adsorbed in Embodiment 1 and a glass substrate 3 with comb-shaped ITO electrodes 4 with a width of 10 μm and an interval of 500 μm therebetween were disposed to be opposite to each other through a spacer with a thickness of 12 μm and were fixed with a clip or the like, without sticking them together, to form a cell.

Subsequently, a mixture of an orientation controlling liquid crystal 6 which is the same as that of Embodiment 1 and an organic compound 12 with a symmetrical molecular structure about a longitudinal axis thereof was injected into the cell. The whole cell was heated up to approximately 100° C., applying a voltage of AC 100 V 60 Hz to the comb-shaped electrodes, and was kept for halt an hour in this state. After cooling, the cell was decomposed and the glass substrate 1 was washed with toluene, whereby an orientation film coated substrate was formed. A liquid crystal device was produced in the same manner as that of Embodiment 1 by using the glass substrate with an orientation film formed in the above manner. Additionally described, since an AC voltage is preferred to a DC voltage to uniformly orient, an AC voltage of 100 V 60 Hz is applied to the electrodes.

As a result of the same examination as that of Embodiment 1, it was found that though the portions opposite to the comb-shaped electrodes were not oriented in a certain direction, the portions between the electrodes were orientated to be uniformly homogeneous.

Further, the ununiformly oriented portions opposite to the comb-shaped electrodes might be applied for portions which are not used for displaying, when the substrate to which the orientation film is applied is practically employed.

Embodiments 9–14

Still further embodiments of the liquid crystal device in which a nematic liquid crystal was injected were produced and examined under the identical conditions with those of Embodiment 8 except that conditions about employed materials and heating temperature are the same as those of Embodiments 2 to 7. It was found that though the portions of the liquid crystal opposite to the comb-shaped electrodes were not oriented in a certain direction, the portions between the comb-shaped electrodes were oriented to be uniformly homogeneous. The invention may be embodied in other specific forms without departing from the spirit or essential characteristics thereof.

What is claimed is:

1. A method for forming an orientation film comprising:
   a first step wherein a silane coupling agent is chemically adsorbed on a substrate surface, and
   a second step wherein an organic compound comprising a functional group capable of coupling with the silane coupling agent is coupled with the silane coupling agent, said second step comprising
   (a) applying a magnetic field in a selected direction to a mixture of: 1) a liquid crystal compound being in a liquid crystal phase when heated, and 2) the organic compound,
   (b) contacting the mixture with the substrate, and
   (c) heating the substrate contacted with mixture to a temperature sufficient for coupling of the silane coupling agent and the organic compound during application of the magnetic field, wherein the organic compound coupled with the silane coupling agent is directed to a direction corresponding to the selected direction of the magnetic field.

2. A method for forming an orientation film as claimed in claim 1, wherein a direction of magnetic field application is parallel to the substrate surface where the silane coupling agent is chemically adsorbed.

3. The method of claim 1 wherein the substrate is first contacted with the mixture, the magnetic field is then applied and the substrate is heated during the magnetic field application.

4. A method for forming an orientation film comprising:
   a first step wherein a silane coupling agent is chemically adsorbed on a substrate surface, and
   a second step wherein an organic compound comprising a functional group capable of coupling with the silane coupling agent is coupled with the silane coupling agent, said second step comprising
   (a) applying an electrical field in a selected direction to a mixture of: 1) a liquid crystal compound being in a liquid crystal phase when heated, and 2) the organic compound,
   (b) contacting the mixture with the substrate, and
   (c) heating the substrate contacted with mixture to a temperature sufficient for coupling of the silane coupling agent and the organic compound during application of the electrical field, wherein the organic compound coupled with the silane coupling agent is directed to a direction corresponding to the selected direction of the electrical field.

5. A method for forming an orientation film as claimed in claim 4, wherein a direction of electrical field application is parallel to the substrate surface where the silane coupling agent is chemically absorbed.

6. A method for forming an orientation film comprising:
   a first step wherein a silane coupling agent is chemically adsorbed on a first substrate surface, and
   a second step wherein an organic compound comprising a functional group capable of coupling with the silane coupling agent is coupled with the silane coupling agent on the first substrate surface, the second step comprising
   (a) positioning opposite to the first substrate a second substrate having a plurality of parallel stripe-shaped electrodes formed on a surface of the second substrate
   (b) disposing between the first and second substrates a mixture of 1) a liquid crystal compound being in a liquid crystal phase when heated and 2) the organic compound, while a voltage is applied to the electrodes so that polarities are different between adjacent electrodes on the second substrate, and
   (c) heating the mixture to a temperature sufficient for coupling of the silane coupling agent and the organic compound during the application of the voltage.

7. A method for forming an orientation film as claimed in any one of claims 1, 4 or 6, wherein the silane coupling agent comprises an epoxide group at one end and the organic compound comprises at least one hydroxyl or amino group.

8. A method for forming an orientation film as claimed in any one of claims 1, 4 or 6, wherein the silane coupling agent comprises a vinyl group and the organic compound comprises at least one amino group.

9. A method for forming an orientation film as claimed in any one of claims 1, 4 or 6, wherein the liquid crystal compound is in a nematic liquid crystal phase when heated.

10. A method for manufacturing a liquid crystal device comprising disposing two substrates with an orientation film formed according to a method as claimed in any one of claims 1, 2, 4, 5 or 6 so that the orientation films thereof face each other, the two substrates being stuck through a spacer to each other, and a gap between the substrates is formed through the spacer, which gap is filled with a liquid crystal.

11. A method for manufacturing a liquid crystal device comprising disposing two substrates with an orientation film formed according to a method as claimed in claim 7 so that the orientation films thereof face each other, the two substrates being stuck through a spacer to each other, and a gap between the substrates is formed through the spacer, which gap is filled with a liquid crystal.

12. A method for manufacturing a liquid crystal device comprising disposing two substrates with an orientation film formed according to a method as claimed in claim 8 so that the orientation films thereof face each other, the two substrates being stuck through a spacer to each other, and a gap between the substrates is formed through the spacer, which gap is filled with a liquid crystal.

13. A method for manufacturing a liquid crystal device comprising disposing two substrates with an orientation film formed according to a method as claimed in claim 9 so that the orientation films thereof face each other, the two substrates being stuck through a spacer to each other, and a gap between the substrates is formed through the spacer, which gap is filled with a liquid crystal.

* * * * *